United States Patent
Schafer et al.

(10) Patent No.: US 6,241,429 B1
(45) Date of Patent: Jun. 5, 2001

(54) HOLDING DEVICE FOR MACHINE TOOL INSERTS

(75) Inventors: Hans Schafer, Gomaringen; Matthias Oettle, Wendlingen, both of (DE)

(73) Assignee: Hartmetall-Werkzeugfabrik Paul Horn GmbH, Tubingen (DE)

( * ) Notice: Subject to any disclaimer, the term of this patent is extended or adjusted under 35 U.S.C. 154(b) by 0 days.

(21) Appl. No.: 09/485,343

(22) PCT Filed: Dec. 9, 1998

(86) PCT No.: PCT/EP98/08018

§ 371 Date: Feb. 8, 2000

§ 102(e) Date: Feb. 8, 2000

(87) PCT Pub. No.: WO99/50012

PCT Pub. Date: Oct. 7, 1999

(30) Foreign Application Priority Data

Mar. 30, 1998 (DE) ................................. 198 14 064

(51) Int. Cl.$^7$ .................................................. B23B 27/04
(52) U.S. Cl. .......................... 407/110; 407/102; 407/117
(58) Field of Search ......................... 407/72, 110, 109, 407/107, 117, 102

(56) References Cited

U.S. PATENT DOCUMENTS

| | | | |
|---|---|---|---|
| 4,357,123 | * | 11/1982 | Zweekly ................................ 407/110 |
| 5,035,545 | * | 7/1991 | Zinner ................................... 407/110 |
| 5,803,675 | * | 9/1998 | Von Haas ............................. 407/107 |

FOREIGN PATENT DOCUMENTS

| | | |
|---|---|---|
| 0385 495 | 9/1990 | (EP) . |
| 95/13892 | 3/1995 | (WO) . |

* cited by examiner

*Primary Examiner*—Henry Tsai
(74) *Attorney, Agent, or Firm*—Roylance, Abrams, Berdo & Goodman, L.L.P.

(57) ABSTRACT

A holding device for machine tool inserts includes a recess delimited by clamping jaws. The recess serves as a clamping seat for the insert. The holding device also includes a slot extending the recess and having a receptacle for a spreading body of a spreader key. The slot has a half-circular expansion on one of its edges serving as a receptacle for the spreading body. The cross section of the spreading body of the spreader key is a polygon outline in the shape of an isosceles triangle whose corners are each rounded with an equal radius of curvature.

20 Claims, 3 Drawing Sheets

HOLDING DEVICE FOR MACHINE TOOL INSERTS

FIELD OF THE INVENTION

The present invention relates to a holding device for machine tool inserts, especially for piercing or cutting inserts. A clamping girder-like cutting tool carrier has a recess formed in the end of the carrier, where a clamping seat delimited by clamping jaws on the cutting tool carrier is formed to receive the inserts. A slot extends from the interior end of the recess as an extension of the recess, and includes a receptacle in which a spreading body is held and provided as part of a spreader key. The spreading body has a non-circular cross-sectional profile and is able to be rotated for the spreading of the slot, and thus, the enlargement of the unobstructed opening of the clamping seat.

BACKGROUND OF THE INVENTION

A holding device for machine tools is disclosed in DE 39 06 822 C3 (corresponding to U.S. Pat. No. 5,035,545). With this conventional holding device, a spreading key is provided having spreading body with an elliptical cross-sectional profile. The receptacle for the spreading body in the slot of the cutting tool carrier has two recesses facing one another in the edges of the slot. The recesses correspond to the two small apex curvature circles of the elliptical cross-sectional profile outline of the spreading body. Due to the precise correspondence of the relevant apex curvature circles required for safe and secure functioning of the known holding device, the spreader key and the cutting tool carrier are costly to manufacture. This costly manufacture is a drawback, and is required principally because of the narrow manufacturing tolerances which need to be maintained to attain the precise correspondence.

SUMMARY OF THE INVENTION

Objects of the present invention are to provide a holding device for machine tool inserts which can be manufactured in an especially simple manner, and thus, is characterized by comparatively low manufacturing costs.

For a holding device for machine tool inserts, these objects are attained according to the present invention by the slot, serving as a receptacle for the spreading body, being an approximately semicircular expansion in one of its two longitudinal edges and by a polygonal profile outline, serving as the cross-sectional profile outline of the spreading body of the spreader key, being in the form of an isosceles triangle. The corners of the triangle are rounded with identical radii of curvature smaller than the radius of the expansion of the slot.

The semicircular expansion of the slot forming the receptacle for the spreading body is quite simple to manufacture in terms of manufacturing technology. Also, the radius of the expansion relative to the curve radius of the rounded corners of the polygonal outline of the spreading body need not be held or made with narrow tolerances.

The spreading occurs by a 60° rotation of the spreading body into a rotary setting in which two rounded corner areas of the polygonal profile outline are aligned within the semicircular expansion and the third rounded corner area is supported with its apex on the facing edge of the slot. In this rotary setting, in which the clamping seat for receiving the tool inserts is opened, the spreading body is located in the receiving area in the slot in automatically locking alignment, so that the operator need not grasp it tightly when the clamping seat is opened for the exchange of inserts.

An especially secure automatic locking is obtained simply by arranging the location of the spreading body in the exemplary embodiments in such a manner that the edge of the slot lying opposite the semicircular expansion includes a slight depression.

Other objects, advantages and salient features of the present invention will become apparent form the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 2:
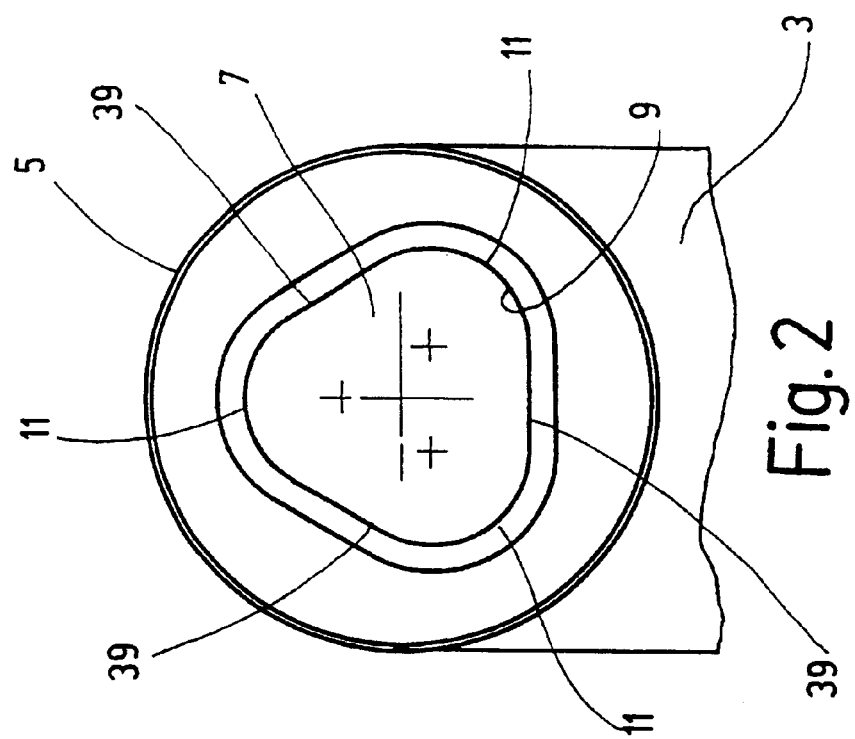
FIG. 2 is a partial front elevational view of the spreading body of the spreader key of FIG. 1, shown in larger scale as compared with FIG. 1.
Figure 1:
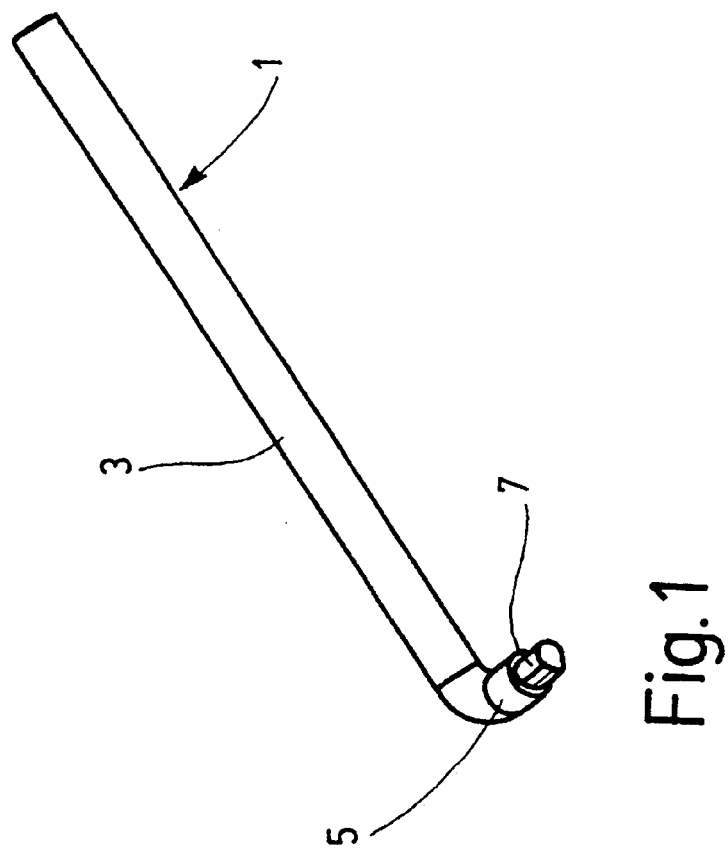
FIG. 1 is a perspective view of a spreader key of a holding device according to an embodiment of the present invention.

In FIGS. 1 and 2, a spreader key 1 has a longitudinally extending handle part 3 and a bent down operating part 5 having a spreading body 7 at the end. The cross-sectional profile of the spreading part, as is shown in FIG. 2 and especially clearly in FIGS. 5 and 6, corresponds to a polygonal profile outline 9 in the shape of an isosceles triangle with rounded corners 11. The rounded corners have identical curve radii.

Figure 3:
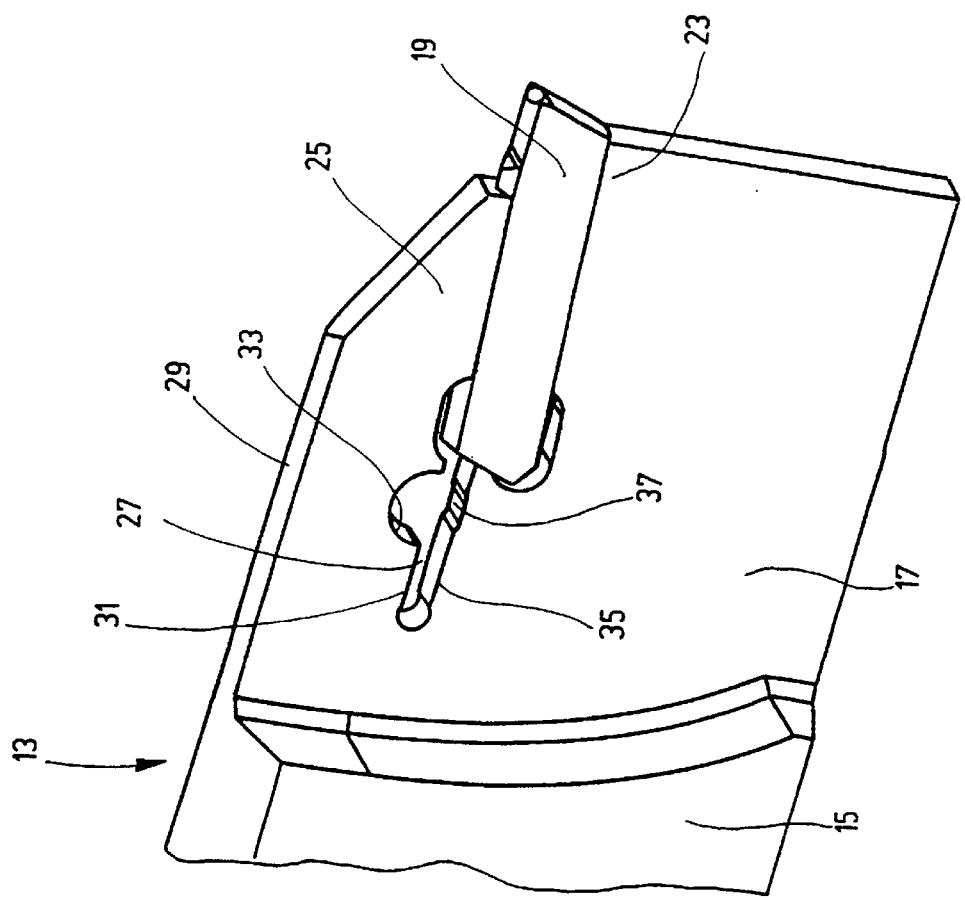
FIG. 3 is a partial, perspective view of the frontal area of a holding device according to an embodiment of the present invention.

As illustrated in detail in FIG. 3, the holding device for tool inserts has a cutting tool carrier 13 forming a clamping girder-like body 15. The thickness of the body in the frontal end area 17 is diminished or reduced for adaptation to narrow piercing or cutting tool inserts 19 received in the holding device.

Figure 4:
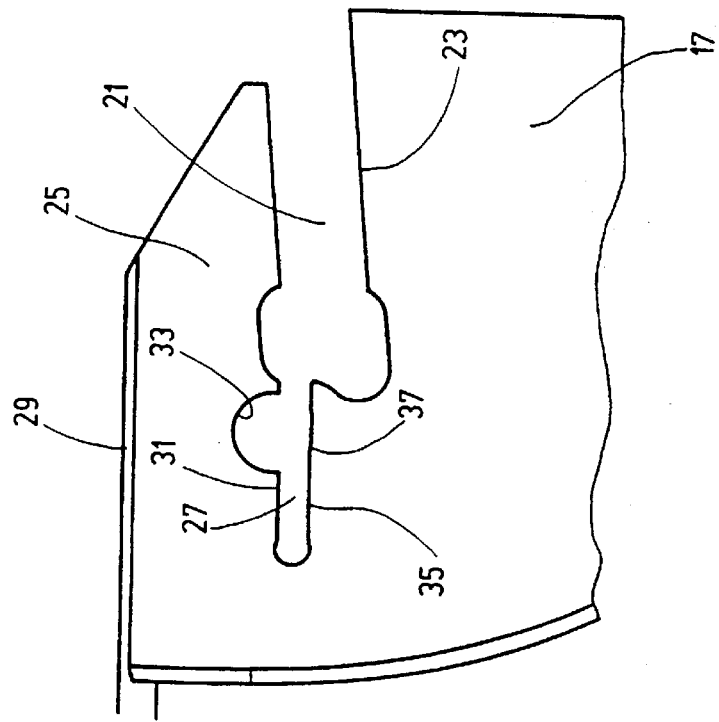
FIG. 4 is a partial, side elevational view of the holding device of FIG. 3, without a tool insert.
Figure 5:
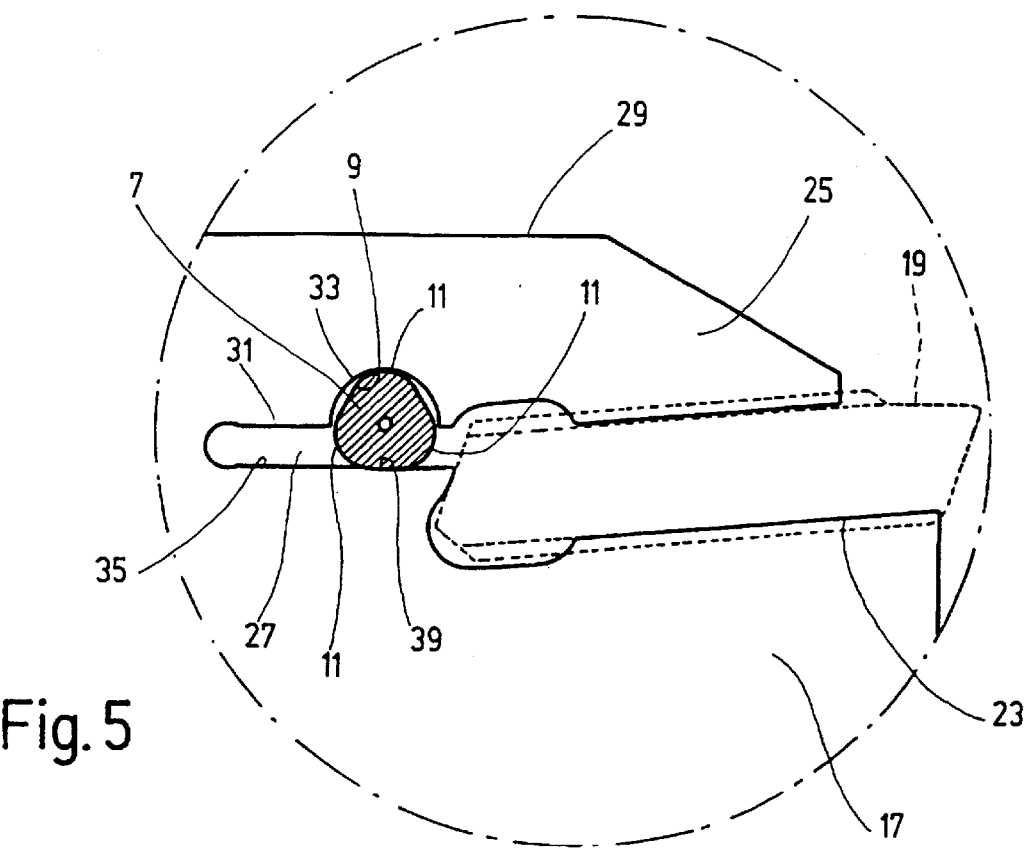
FIG. 5 is an enlarged, diagrammatic, side elevational view of the holding device of FIG. 3 adjacent to the clamping seat, with the clamping seat closed.
Figure 6:
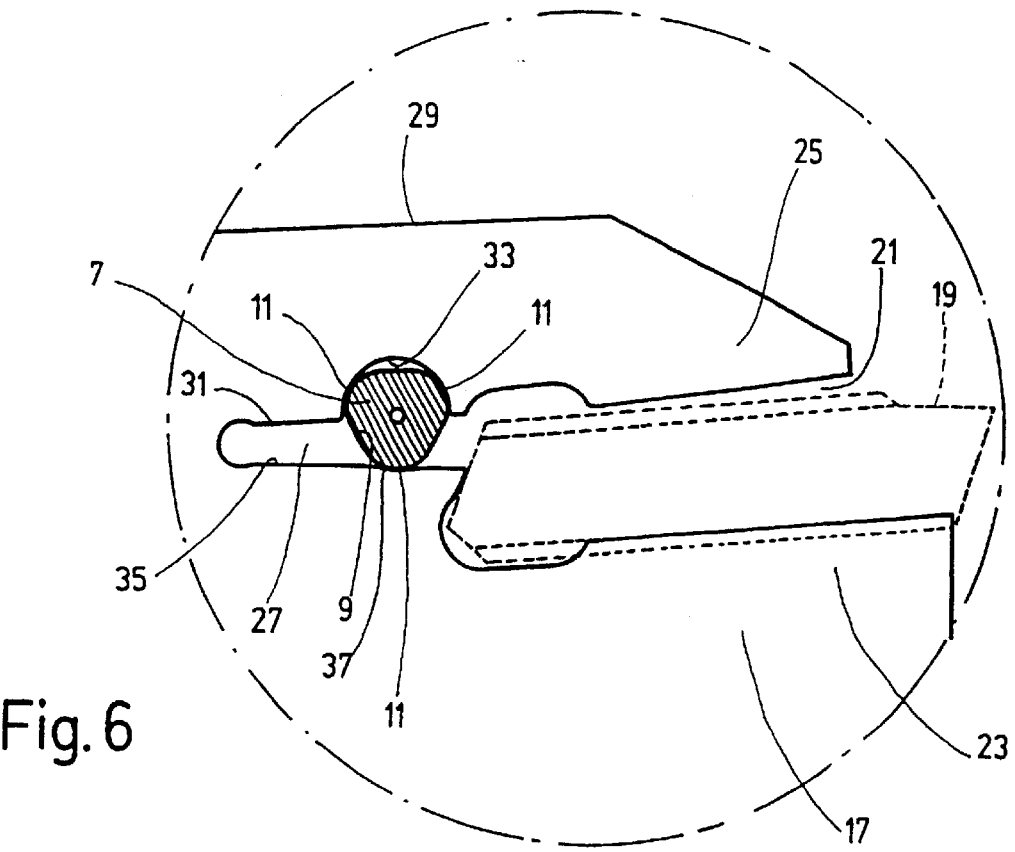
FIG. 6 is an enlarged, diagrammatic, side elevational view of the holding device of FIG. 3, adjacent to the clamping seat, with the clamping seat opened.

As is shown in most clearly in FIGS. 4 to 6, in the front end area 17, a recess 21 is open to the front and is formed by a clamping seat intended for the relevant tool inserts. The recess is delimited in its unobstructed opening by a bottom clamping jaw 23 and a top clamping jaw 25. A slot 27 extends essentially straight and parallel to the adjacent side edge 29 of the end area 17, and is an extension of the interior widened end of recess 21. In the vicinity of the front end of the slot 27, on its edge 31, adjacent to the side edge 29 of the end area 17, slot 27 has a semicircular expansion 33. Expansion 33 forms a receiving area in slot 27 for the spreading body 7 of spreader key 1 to be inserted therein. On its opposite edge 35, slot 27 has a small depression 37 aligned with expansion area 33 and arranged opposite to expansion 33 (see particularly FIG. 3).

Expansion 33 extends perpendicularly to the adjacent side edge 29 of end area 17. On the adjacent clamping jaw 25, such area provides an area of decreased cross-sectional surface, so that for clamping jaw 35 a certain capacity for elastic expansion is obtained. In this manner, the clamping seat formed by clamping jaws 23 and 25 can be opened, as indicated clearly and with some exaggeration in FIG. 6. This opening is obtained by rotation of spreading body 7 from the closed setting shown in FIG. 5 for an angular distance of 60° in the appropriate direction. As shown in FIG. 5, when the radius of semicircular expansion 33 of slot 27 corresponds to at least half of the largest diameter of polygonal profile outline 9, spreading body 7 can be inserted in a rotary setting in which one flat side 39 of polygonal profile 9 engages on the edge 35 of slot 27 and one of the corner areas 11 is located in the expansion 33. The clamping seat is opened by rotation of spreading body 60° into the setting shown in FIG. 6, in which two corner areas 11 are located in the expansion 33 and one corner area 11 is supported on the edge 35 of slot 27. As is clear from FIG. 6, without further explanation, no rotary torque works on spreading body 7 in this rotary setting, so that the setting is automatically locked. Additionally, depression 37 in edge 35 of slot 27 provides an additional elastic rotary setting, by which, upon rotation of the spreading body, the operator is signaled that the rotary setting has been attained which corresponds to the opened setting of the clamping seat.

While a particular embodiment has been chosen to illustrate the invention, it will be understood by those skilled in the art that various changes and modifications can be made therein without departing from the scope of the invention as defined in the appended claims.

What is claimed is:

1. A holding device for machine tool inserts, comprising:
a cutting tool carrier having a recess in one end thereof;
first and second clamping jaws on said carrier defining a clamping seat therebetween to receive a tool insert;
a slot at an interior end of said recess and formed as an extension thereof, said slot having first and second edges and a receiving area with an approximately semicircular expansion on said first edge; and
a spreader key having a spreading body rotatably received in said receiving area and movable between first and second angularly spaced positions, said spreading body having a polygonal cross-sectional profile in a shape on an isosceles triangle with rounded corners of an identical radius of curvature smaller than a radius of curvature of said semicircular expansion, in first angular position said spreading body does not expand said slot and does not enlarge said clamping seat, in said second angular position said spreading body expands said slot and enlarges said clamping seat.

2. A holding device according to claim 1 wherein said radius of curvature of said semicircular expansion is at least one-half of a largest diameter of said polygonal cross-sectional profile.

3. A holding device according to claim 2 wherein a slight depression is formed in said second edge of said slot opposite said semicircular expansion.

4. A holding device according to claim 2 wherein a slight depression is formed in said second edge of said slot opposite said semicircular expansion.

5. A holding device according to claim 4 wherein said slot extends essentially parallel to an adjacent side of said carrier.

6. A holding device according to claim 3 wherein said slot extends essentially parallel to an adjacent side of said carrier.

7. A holding device according to claim 2 wherein said slot extends essentially parallel to an adjacent side of said carrier.

8. A holding device according to claim 1 wherein said slot extends essentially parallel to an adjacent side of said carrier.

9. A holding device according to claim 8 wherein said semicircular expansion extends from said first edge perpendicular to said adjacent side edge of said carrier, and forms an area of decreased cross-sectional area on an adjacent one of said clamping jaws.

10. A holding device according to claim 7 wherein said semicircular expansion extends from said first edge perpendicular to said adjacent side edge of said carrier, and forms an area of decreased cross-sectional area on an adjacent one of said clamping jaws.

11. A holding device according to claim 6 wherein said semicircular expansion extends from said first edge perpendicular to said adjacent side edge of said carrier, and forms an area of decreased cross-sectional area on an adjacent one of said clamping jaws.

12. A holding device according to claim 5 wherein said semicircular expansion extends from said first edge perpendicular to said adjacent side edge of said carrier, and forms an area of decreased cross-sectional area on an adjacent one of said clamping jaws.

13. A holding device according to claim 12 wherein said spreader key has a longer handle arm and a shorter arm forming an L-shape, said shorter arm being joined to said handle arm by a bend and forming said spreading body.

14. A holding device according to claim 9 wherein said spreader key has a longer handle arm and a shorter arm forming an L-shape, said shorter arm being joined to said handle arm by a bend and forming said spreading body.

15. A holding device according to claim 5 wherein said spreader key has a longer handle arm and a shorter arm forming an L-shape, said shorter arm being joined to said handle arm by a bend and forming said spreading body.

16. A holding device according to claim 6 wherein said spreader key has a longer handle arm and a shorter arm forming an L-shape, said shorter arm being joined to said handle arm by a bend and forming said spreading body.

17. A holding device according to claim 3 wherein said spreader key has a longer handle arm and a shorter arm forming an L-shape, said shorter arm being joined to said handle arm by a bend and forming said spreading body.

18. A holding device according to claim 2 wherein said spreader key has a longer handle arm and a shorter arm forming an L-shape, said shorter arm being joined to said handle arm by a bend and forming said spreading body.

19. A holding device according to claim 1 wherein said spreader key has a longer handle arm and a shorter arm forming an L-shape, said shorter arm being joined to said handle arm by a bend and forming said spreading body.

20. A holding device according to claim 1 wherein said polygonal cross-sectional profile comprises flat sides between said rounded corners.

* * * * *